United States Patent [19]

Bland

[11] Patent Number: 4,592,733

[45] Date of Patent: Jun. 3, 1986

[54] WATER PUMP FOR MARINE PROPULSION DEVICES

[75] Inventor: Gerald F. Bland, Glenview, Ill.

[73] Assignee: Outboard Marine Corporation, Waukegan, Ill.

[21] Appl. No.: 560,593

[22] Filed: Dec. 12, 1983

[51] Int. Cl.$^4$ .......................................... B63H 21/38
[52] U.S. Cl. ........................................ 440/88; 418/154
[58] Field of Search .......... 440/88; 403/352, 355–359, 403/383, 350, 351, 354, 367, DIG. 8; 418/154, 155, 156; 464/182

[56] References Cited

U.S. PATENT DOCUMENTS

| | | | |
|---|---|---|---|
| 2,466,440 | 4/1949 | Kiekhaefer | 418/154 |
| 2,634,991 | 4/1953 | Stevens | 403/383 |
| 3,434,369 | 3/1969 | Runkle | 403/350 |
| 3,626,719 | 12/1971 | Church | 403/383 |
| 3,867,050 | 2/1975 | Pitner | 403/383 |
| 4,361,196 | 11/1982 | Hoyle, Jr. | 403/350 |

FOREIGN PATENT DOCUMENTS

| | | | |
|---|---|---|---|
| 1133271 | 3/1957 | France | 418/154 |
| 197710 | 10/1977 | U.S.S.R. | 403/358 |

Primary Examiner—Trygve M. Blix
Assistant Examiner—Edwin L. Swinehart
Attorney, Agent, or Firm—Michael, Best & Friedrich

[57] ABSTRACT

A marine propulsion device comprising an engine with a cooling jacket and a fluid pump assembly for circulating water through the cooling jacket. The fluid pump assembly comprises a housing including a pump chamber, an impeller within the housing, a drive shaft extending into the pump, means for rotating the drive shaft, and interengaging means on the drive shaft and on the impeller for driving the impeller with the drive shaft so as to locate the drive shaft and the impeller in a single driving relation to each other.

12 Claims, 6 Drawing Figures

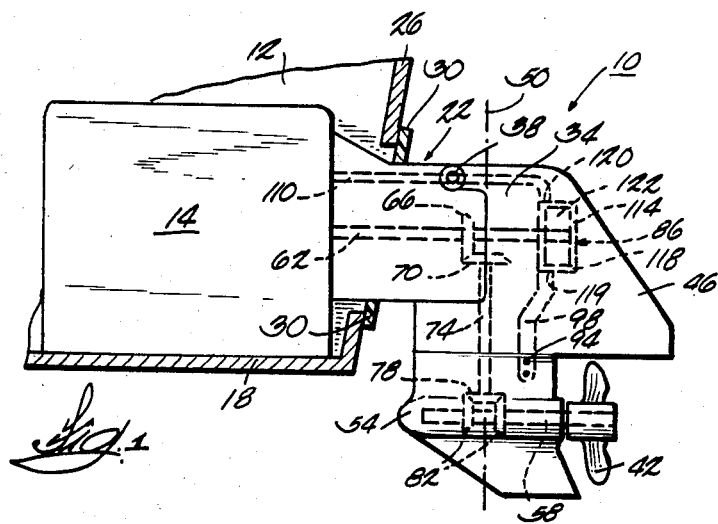
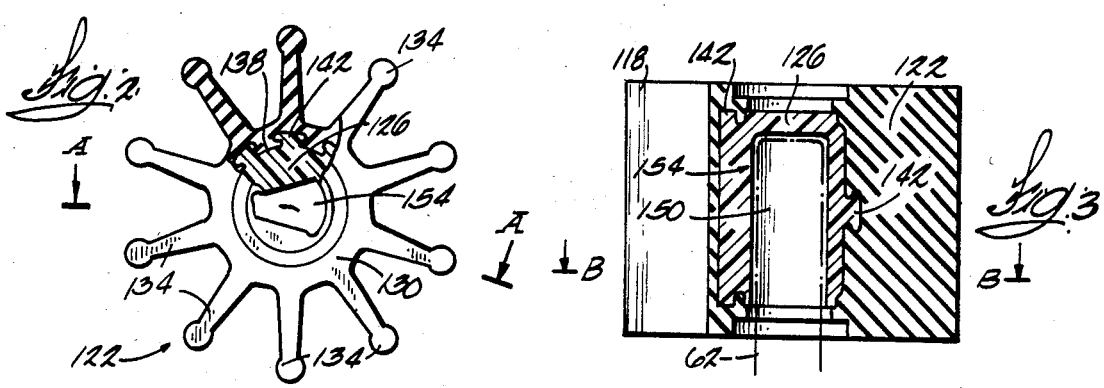
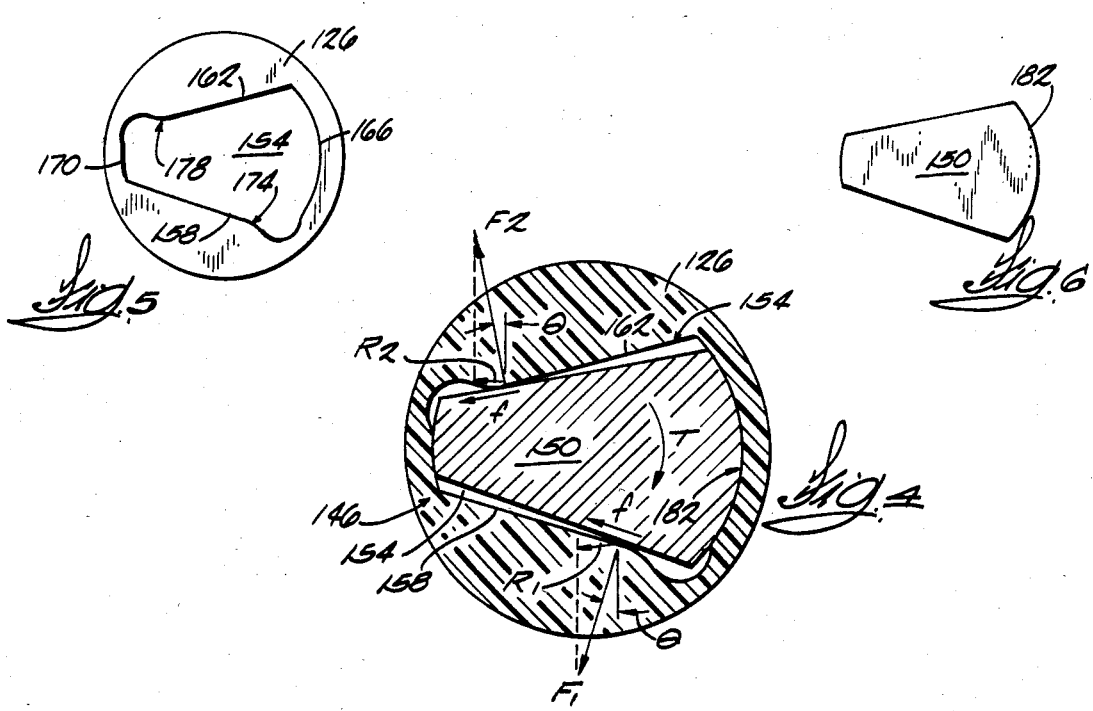

WATER PUMP FOR MARINE PROPULSION DEVICES

BACKGROUND OF THE INVENTION

This invention relates to water pumps for marine propulsion devices, and more particularly to the impeller-drive shaft assembly of such a water pump.

Water pumps in marine propulsion devices typically have rubber vaned impellers that are eccentrically located in the pump chamber. Such an impeller is inherently unevenly loaded, and this causes a wearing action between the impeller assembly and the drive shaft with each rotation.

This wearing action necessitates the impeller assembly's having an inner member which receives the drive shaft and is made of strong, wear-resistant material, and an outer impeller member having a rubber vaned portion. The inner member is usually molded and/or bonded to the outer impeller member and is typically made of bronze, stainless steel, or other corrosive-resistant materials.

A common practice is to adhesively bond the inner member to the rubber outer member during the molding process. In operation this adhesive bond can break down and allow the inner member to rotate relative to the outer member, rendering the water pump inoperable.

Typical means for the driving of the impeller assembly by the drive shaft are a woodruff key and slot, spline joints, and drive pins, for example. With extended operation, the wearing action between these drive mechanisms and the inner member can cause damage to either member and can ultimately result in failure of the water pump.

Attention is directed to the following U.S. patents which disclose pump impeller-shaft assemblies.

| Patentee | U.S. Pat. No. | Issued |
| --- | --- | --- |
| Klein | 2,070,738 | Feb. 16, 1937 |
| Mayus | 2,663,263 | Dec. 22, 1953 |
| Doble | 2,892,646 | June 30, 1959 |
| Bandli | 2,899,902 | Aug. 18, 1959 |
| McLean | 2,971,469 | Feb. 14, 1961 |
| Swanson | 3,097,610 | July 16, 1963 |
| Kramer | 3,113,527 | Dec. 10, 1963 |

SUMMARY OF THE INVENTION

The invention provides a marine propulsion device comprising an engine with a cooling jacket and a fluid pump assembly for circulating water through the cooling jacket. The fluid pump assembly comprises a housing including a pump chamber, an impeller within the housing, a drive shaft extending into the pump chamber, means for rotating the drive shaft, and interengaging means on the drive shaft and on the impeller for driving the impeller with the drive shaft so as to locate the drive shaft and the impeller in a single driving relation to each other.

In one embodiment, the interengaging means on the drive shaft includes a generally wedge-shaped portion within the pump chamber, and the interengaging means on the impeller includes a generally wedge-shaped drive slot receiving the wedge-shaped portion of the drive shaft.

In one embodiment, the impeller further includes an inner member in which the drive slot is located, and an outer member concentrically mounted on the inner member and having a plurality of flexible vanes extending radially outwardly therefrom. The outer member of the impeller includes a plurality of projections extending radially inwardly therefrom and the inner member includes a plurality of projections extending radially outwardly therefrom and fixedly interlocked with the projections on the outer member.

In one embodiment, the wedge-shaped portion of the drive shaft includes an arcuate surface and the generally wedge-shaped drive slot comprises first and second side walls with respective converging and diverging ends, an arcuate long end wall having the same radius as the arcuate surface of the drive shaft and connecting the divergent ends of the side walls, and a short end wall connecting the convergent ends of the side walls. The first side wall has a first edge which extends parallel to the axis of the drive shaft and which provides a first line of contact with the wedge-shaped portion of the drive shaft, and the second side wall has a second edge which extends parallel to the axis of the drive shaft and which provides a second line of contact with the wedge-shaped portion of the drive shaft.

The invention also provides a fluid pump assembly comprising a housing including a pump chamber, a drive shaft extending into the pump chamber, and means for rotating the drive shaft. The assembly further comprises an impeller within the housing, and interengaging means on the drive shaft and on the impeller for driving the impeller with the drive shaft so as to locate the drive shaft and the impeller in a single driving relation to each other.

The invention also provides a drive shaft including a generally wedge-shaped portion, the wedge-shaped portion comprising first and second side walls with respective converging and diverging ends, an arcuate long end wall connecting the divergent ends of the side walls, and a short end wall connecting the convergent ends of the side walls.

The invention also provides an impeller comprising a central portion including a generally wedge-shaped drive slot and plurality of flexible vanes extending radially outwardly from the central portion. The drive slot comprises first and second side walls with respective converging and diverging ends, an arcuate long end wall connecting the divergent ends of the side walls, and a short end wall connecting the convergent ends of the side walls.

A principal feature of the invention is the geometry of the drive slot and the drive shaft. This geometry causes the inner member of the impeller to be firmly seated against the drive shaft during operation, thereby eliminating wear between the two parts.

Another principal feature of the invention is that the drive force is distributed along the full length of the drive slot.

Another principal feature of the invention is the interlocking projections on the impeller and on the inner member. This substantially eliminates the breaking of the bond between the two parts.

Other features and advantages of the invention will become apparent to those skilled in the art upon reviewing the following detailed description, the drawings, and the claims.

DESCRIPTION OF THE DRAWINGS

FIG. 1 is a side view of a marine propulsion device mounted on a boat.

FIG. 2 is an end view of the impeller of the invention, with a cut-away portion showing the inner and outer members of the impeller.

FIG. 3 is a cross-sectional view of the impeller, the drive shaft, and the pump chamber, taken along line A—A in FIG. 2.

FIG. 4 is a cross-sectional view of the drive shaft engaging the inner member of the impeller, taken along line B—B in FIG. 3.

FIG. 5 is a cross-sectional view of the drive slot in the inner member, taken along line B—B in FIG. 3.

FIG. 6 is a cross-sectional view of the wedge-shaped portion of the drive shaft, taken along line B—B in FIG. 3.

DESCRIPTION OF THE PREFERRED EMBODIMENT

Illustrated in FIG. 1 is a marine propulsion device 10 mounted on a boat 12. It is to be understood that while in this embodiment the marine propulsion device 10 is of the inboard/outboard or stern drive type, in alternative embodiments the marine propulsion device 10 could be another type, including an outboard motor.

In this embodiment, the marine propulsion device 10 includes an engine 14 with a cooling jacket. The engine 14 is securely mounted on the boat frame 18.

The marine propulsion device 10 also includes a transom unit 22 mounted on the engine 14 and projecting through the transom 26 of the boat 12. A flexible diaphragm seal 30 surrounds the transom unit 22 and is secured to the transom 26 to exclude water, spray, and exhaust gas from the boat 12.

The marine propulsion device 10 further includes a swivel support 34 pivotally connected to the transom unit 22 for tilting movement in the vertical plane relative to the transom 26 of the boat 12, whereby to provide for movement in the vertical plane about a tilt axis 38 between a lowermost position with the propeller 42 fully submerged in water for driving propulsion and a raised position affording above-water access to the propeller 42.

The marine propulsion device 10 also includes a propulsion unit 46 pivotally mounted on the swivel support 34 for steering movement of the propulsion unit 46 in the horizontal plane, about a steering axis 50. The propulsion unit 46 includes a gear case 54 housing the propeller shaft 58, on which the propeller 42 is mounted.

As further illustrated in FIG. 1, the engine 14 drives a horizontal shaft 62. A bevel gear 66 on the horizontal drive shaft 62 drives a bevel gear 70 on the upper end of a vertical drive shaft 74 for rotational driving of the vertical drive shaft 74. The lower end of the vertical drive shaft 74 is connected to a driving gear 78. A pair of driven gears 82 are selectively clutched to the propeller shaft 58 to transmit forward or reverse motion to the propeller shaft 58 from the driving gear 78 on the vertical drive shaft 74.

A water pump 86 is provided to supply cooling water to the cooling jacket of the engine 14. In this embodiment, the water pump 86 is located at the aft end of the horizontal drive shaft 62. It should be understood that in alternative embodiments the water pump 86 could be located anywhere that driving means could be provided. It should also be remembered that other types of marine propulsion devices might be employed. In other embodiments, the water pump 86 could be located, for example, on an extension of either end of the vertical drive shaft 74, in the middle of the vertical drive shaft 74, or in the middle of the horizontal drive shaft 62.

The water pump 86 comprises a housing 114 including a pump chamber 118, a water inlet 119, and a water outlet 120. Openings in the side of the propulsion unit 46 form the water intake 94. A passage 98 connects the water intake 94 to the water inlet 119 of the pump 86. The water outlet 120 is connected to a passage 110 which carries water to the engine cooling jacket.

The water pump 86 further comprises an impeller 122 within the housing 114. As best shown in FIG. 2, the impeller 122 comprises an inner member 126, and an outer member 130 concentrically mounted on the inner member 126 and having a plurality of flexible vanes 134 extending radially outwardly therefrom. The outer member 130 of the impeller 122 includes a plurality of projections 138 extending radially inwardly therefrom, and the inner member 126 includes a plurality of projections 142 extending radially outwardly therefrom and fixedly interlocked with the projections 138 on the outer member 126. See FIGS. 2 and 3.

In this embodiment, as shown in FIGS. 1 and 3, the aft end of the horizontal drive shaft 62 extends into the pump chamber 118. As shown in FIG. 4, interengaging means 146 are provided on the aft end of the horizontal drive shaft 62 and on the inner member 126 of the impeller 122 for driving the impeller 122 with the horizontal drive shaft 62 so as to locate the horizontal drive shaft 62 and the impeller 122 in a single driving relation to each other. While various suitable means could be employed for this purpose, in the specified construction illustrated, the interengaging means 146 includes a generally wedge-shaped portion 150 (shown in FIGS. 3, 4 and 6) of the aft end of the horizontal drive shaft 62 within the pump chamber 118, and a generally wedge-shaped drive slot 154 (shown in FIGS. 2-5) in the inner member 126 of the impeller 122 receiving the wedge-shaped portion 150 of the horizontal drive shaft 62, as best shown in FIGS. 3 and 4.

In this embodiment, with the water pump 86 located at the aft end of the horizontal drive shaft 62, the drive shaft 62 does not extend completely through the inner member 122. See FIG. 3. This prevents water leakage along the drive shaft 62 in the direction of the enclosed end. In alternative embodiments, the drive shaft 62 could extend completely through the inner member 126.

As illustrated in FIG. 5, the generally wedge-shaped drive slot 154 comprises first and second side walls 158 and 162 with respective converging and diverging ends, an arcuate long end wall 166 connecting the diverging ends of the side walls 158 and 162, and a short end wall 170 connecting the convergent ends of the side walls 158 and 162. The first side wall 158 has a first edge or portion 174 which extends parallel to the axis of the horizontal drive shaft 62 and which provides a first line of contact with the wedge-shaped portion 150 of the horizontal drive shaft 62. The second side wall 162 has a second edge or portion 178 which extends parallel to the axis of the horizontal drive shaft 62 and which provides a second line of contact with the wedge-shaped portion 150 of the horizontal drive shaft 62. The first edge 174 on the first side wall 158 is located near the long end wall 166, and the second edge 178 on the second side wall 162 is located near the short end wall 170.

As shown in FIG. 6, the wedge-shaped portion 150 of the horizontal drive shaft 62 includes two side walls which are joined by an arcuate surface 182 having the same radius as the arcuate long end wall 166 of the drive slot 154. When a torque is applied to the horizontal drive shaft 62, as in FIG. 4, forces exerted by the horizontal drive shaft 62 on the inner member 126 at the first and second edges 174 and 178 cause the inner member 126 to be firmly seated against the horizontal drive shaft 62, with the arcuate long end wall 166 of the drive slot 154 abutting, in no-slip contact, the arcuate surface 182 of the horizontal drive shaft 62.

These forces, $F_1$ and $F_2$, are illustrated in FIG. 4. The forces are exerted perpendicular to the side walls 158 and 162 of the drive slot 154, and have components $R_1$ and $R_2$ respectively, in the direction shown. Additionally, frictional forces $f_1$ and $f_2$ serves to maintain the firm seating of the inner member 126. The forces $f_1$ and $f_2$ are equal to F multiplied by the coefficient of friction. The component of each frictional force in the direction of R is equal to f cos.

Therefore, the total force serving to seat the inner member 126 firmly against the arcuate surface 182 of the shaft 62 is equal to:

$$R_1 + R_2 + f_1 \cos + f_2 \cos.$$

This total force is sufficiently larger than the side loading force inherently present in the pump 86 so that the inner member 126 will be firmly seated against the arcuate surface 182 of the drive shaft 62, as shown in FIG. 4. This substantially eliminates wear between the drive shaft 62 and the inner member 126 of the impeller 122, thereby reducing the need to periodically replace the inner member 126 of the impeller 122.

Also, the drive forces are applied over the full length of the drive slot 154 along the edges 174 and 178. This distribution eases the strain on the inner member 126, further reducing wear.

Various of the features of the invention are set forth in the following claims.

I claim:

1. A marine propulsion device comprising an engine with a cooling jacket, and a fluid pump assembly for circulating water through said cooling jacket, said fluid pump assembly comprising a housing including a pump chamber, a drive shaft extending into said pump chamber, means for rotating said drive shaft, an impeller within said housing, and interengaging wedge-shaped means on said drive shaft and on said impeller defining first and second lines of engagement extending between said impeller and said drive shaft in parallel relation to the axis of drive shaft rotation, which lines of engagement produce forces effective to locate said drive shaft and said impeller in a single driving relation to each other, said wedge-shaped means including first and second convergent side walls on said shaft and in respective driving engagement with said impeller solely along said first and second lines of engagement.

2. A marine propulsion device in accordance with claim 1 wherein said interengaging means on said drive shaft includes a generally wedge-shaped portion within said pump chamber, and wherein said interengaging means on said impeller includes a generally wedge-shaped drive slot receiving said wedge-shaped portion of said drive shaft.

3. A marine propulsion device in accordance with claim 2 wherein said impeller further includes an inner member in which said drive slot is located, and an outer member concentrically mounted on said inner member and having a plurality of flexible vanes extending radially outwardly therefrom.

4. A marine propulsion device in accordance with claim 3 wherein said outer member of said impeller includes a plurality of projections extending radially inwardly therefrom and wherein said inner member includes a plurality of projections extending radially outwardly therefrom and fixedly interlocked with said projections on said outer member.

5. A marine propulsion device in accordance with claim 2 wherein said wedge-shaped portion of said drive shaft includes an arcuate surface and wherein said generally wedge-shaped drive slot comprises first and second side walls with respective converging and diverging ends, said first side wall having a first portion which extends parallel to the axis of said drive shaft and which provides a first line of contact with said wedge-shaped portion of said drive shaft, said second side wall having a second portion which extends parallel to the axis of said drive shaft and which provides a second line of contact with said wedge shaped portion of said drive shaft, an arcuate long end wall having the same radius as said arcuate surface of said drive shaft and connecting said divergent ends of said side walls, and a short end wall connecting said convergent ends of said side walls.

6. A marine propulsion device in accordance with claim 5 wherein said first and second side wall portions are located such that when said drive shaft is rotated, said first line of contact is located near the leading end of said long end wall of said drive shaft, and said second line of contact is located near the leading end of said short end wall of said drive shaft.

7. A marine propulsion device comprising an engine with a cooling jacket, and a fluid pump assembly for circulating water through said cooling jacket, said fluid pump assembly comprising a housing including a pump chamber, a drive shaft extending into said pump chamber, said drive shaft including within said pump chamber a generally wedge-shaped portion including an arcuate surface, means for rotating said drive shaft, and an impeller within said housing, said impeller including an inner member having a generally wedge-shaped drive slot receiving said wedge-shaped portion of said drive shaft, said generally wedge-shaped drive slot comprising an arcuate long end wall having the same radius as said arcuate surface of said drive shaft and having leading and trailing ends, a short end wall having leading and trailing ends, and first and second side walls with respective converging ends connecting said ends of said short end wall and with respective diverging ends connecting said ends of said long end wall, said first side wall having a first portion which extends parallel to the axis of said drive shaft and which provides a first line of contact with said wedge-shaped portion of said drive shaft, said first portion being located such that when said drive shaft is rotated, said first line of contact is located near said leading end of said short end wall, and said second side wall having a second portion which extends parallel to the axis of said drive shaft and which provides a second line of contact with said wedge-shaped portion of said drive shaft, said second portion being located such that when said drive shaft is rotated, said second line of contact is located near said leading end of said long end wall, and an outer member concentrically mounted on said inner member and having a plurality of flexible vanes extending radially outwardly therefrom, said outer member of said impeller including a plurality of projections extending radially inwardly therefrom and said, inner member including a plurality of projections extending radially outwardly therefrom and fixedly interlocked with said projections on said outer member.

8. A fluid pump assembly comprising a housing including a pump chamber, a drive shaft extending into said pump chamber, means for rotating said drive shaft, an impeller within said housing, and interengaging wedge-shaped means on said drive shaft and on said impeller defining first and second lines of engagement extending between said impeller and said drive shaft in parallel relation to the axis of drive shaft rotation, which lines of engagement produce forces effective to locate said drive shaft and said impeller in a single driving relation to each other, said wedge-shaped means including first and second convergent side walls on said shaft and in respective driving engagement with said impeller solely along said first and second lines of engagement.

9. A fluid pump assembly in accordance with claim 8 wherein said interengaging means on said drive shaft includes a generally wedge-shaped portion within said pump chamber, and wherein said interengaging means on said impeller includes a generally wedge-shaped drive slot receiving said wedge-shaped portion of said drive shaft.

10. An impeller comprising central portion including a generally wedge-shaped drive slot comprising first and second side walls each having respective converging and diverging ends, one of said side walls including a first wall portion and, adjacent said converging end, a curved portion extending tangentiality from said first wall portion and away from said other of said side walls, and said other side wall including a first wall portion and, adjacent said diverging end, a curved portion extending tangentiality from said first wall portion of said other wall and away from said one side wall, a long end wall connecting said divergent ends of said side walls, and a short end wall connecting said convergent ends of said side walls, and a plurality of flexible vanes extending radially outwardly from said central portion.

11. A marine propulsion device comprising an engine with a cooling jacket, and a fluid pump assembly for circulating water through said cooling jacket, said fluid pump assembly comprising a housing including a pump chamber, a drive shaft extending into said pump chamber and including a male portion with a wedge-shaped configuration, means for rotating said drive shaft, and an impeller within said chamber and including a female socket with a wedge-shaped configuration which is larger than said wedge-shaped configuration of said male portion, which is defined by continuous integral interior wall surfaces, and which receives said drive shaft male portion, said continuous integral interior wall surfaces including spaced first and second side walls in driven engagement with said drive shaft male portion solely along respective first and second lines of engagement extending in parallel relation to the axis of drive shaft rotation.

12. A fluid pump assembly comprising a housing including a pump chamber, a drive shaft extending into said pump chamber and including a male portion with a wedge-shaped configuration, means for rotating said drive shaft, and an impeller within said chamber and including a female socket with a wedge-shaped configuration which is larger than said wedge-shaped configuration of said male portion, which is defined by continuous integral interior wall surfaces, and which receives said drive shaft male portion, said continuous integral interior wall surfaces including spaced first and second side walls in driven engagement with said drive shaft male portion soley along respective first and second lines of engagement extending in parallel relation to the axis of drive shaft rotation.

* * * * *